(12) United States Patent
Matsuo et al.

(10) Patent No.: US 6,587,412 B1
(45) Date of Patent: Jul. 1, 2003

(54) APPARATUS AND METHOD FOR DETECTING ABNORMAL INSERTION OF DISC BODY

(75) Inventors: Kazunori Matsuo, Saitama-ken (JP);
Teruo Takahashi, Saitama-ken (JP);
Yoshimichi Nishio, Saitama-ken (JP);
Yasutaka Suzuki, Saitama-ken (JP);
Hideaki Watarihana, Saitama-ken (JP);
Hiroki Goto, Saitama-ken (JP);
Tomomichi Kimura, Saitama-ken (JP);
Susumu Yoshida, Saitama-ken (JP);
Hiroyuki Kobayashi, Saitama-ken (JP);
Hidetsugu Kubota, Saitama-ken (JP);
Takuya Abe, Saitama-ken (JP)

(73) Assignee: Pioneer Corporation, Tokyo-To (JP)

( * ) Notice: Subject to any disclaimer, the term of this patent is extended or adjusted under 35 U.S.C. 154(b) by 317 days.

(21) Appl. No.: 09/672,085

(22) Filed: Sep. 29, 2000

(30) Foreign Application Priority Data

Oct. 1, 1999 (JP) .......................................... 11-281993

(51) Int. Cl.⁷ ................................................. G11B 7/00
(52) U.S. Cl. .................................................. 369/53.12
(58) Field of Search ........................ 369/53.12, 53.13, 369/53.42, 75.1, 75.2, 77.1, 44.32

(56) References Cited

U.S. PATENT DOCUMENTS

| | | | | |
|---|---|---|---|---|
| 4,507,768 A | | 3/1985 | Ikedo et al. | |
| 4,723,234 A | * | 2/1988 | Katsuyama et al. | 369/53.28 |
| 4,876,619 A | * | 10/1989 | Suzuki | 369/97.01 |
| 5,119,356 A | * | 6/1992 | Matsuoka et al. | 369/53.2 |
| 5,140,575 A | * | 8/1992 | Fushiki | 369/44.32 |
| 5,142,523 A | * | 8/1992 | Kamoshita | 369/75.2 |
| 5,150,349 A | | 9/1992 | Takai et al. | |
| 5,388,094 A | * | 2/1995 | Park | 369/270 |
| 5,574,711 A | * | 11/1996 | Nakamichi | 369/77.1 |
| 5,796,697 A | * | 8/1998 | Masaki et al. | 369/75.1 |
| 5,815,487 A | * | 9/1998 | Fujisawa | 369/291 |
| 6,151,293 A | * | 11/2000 | Aoki et al. | 369/286 |
| 6,418,114 B1 | * | 7/2002 | Yamashita | 369/291 |

FOREIGN PATENT DOCUMENTS

| | | | |
|---|---|---|---|
| EP | 0 890 947 A1 | | 1/1999 |
| JP | 61-24052 | | 2/1986 |
| JP | 01273262 A | * | 11/1989 |
| JP | 06076447 A | * | 3/1994 |

* cited by examiner

Primary Examiner—Thang V. Tran
(74) Attorney, Agent, or Firm—Young & Thompson

(57) ABSTRACT

An apparatus for detecting the absence or the presence of the occurrence of the abnormal insertion that a plurality of disc bodies each of which should be inserted separately one by one are inserted consecutively, provided with: a passing detecting device for detecting the passing of the disc body, mounted on the passing route of the disc body, and a determining device for determining the occurrence of the abnormal insertion if the detecting device detects the passing again after the detecting device detected the passing once.

30 Claims, 12 Drawing Sheets

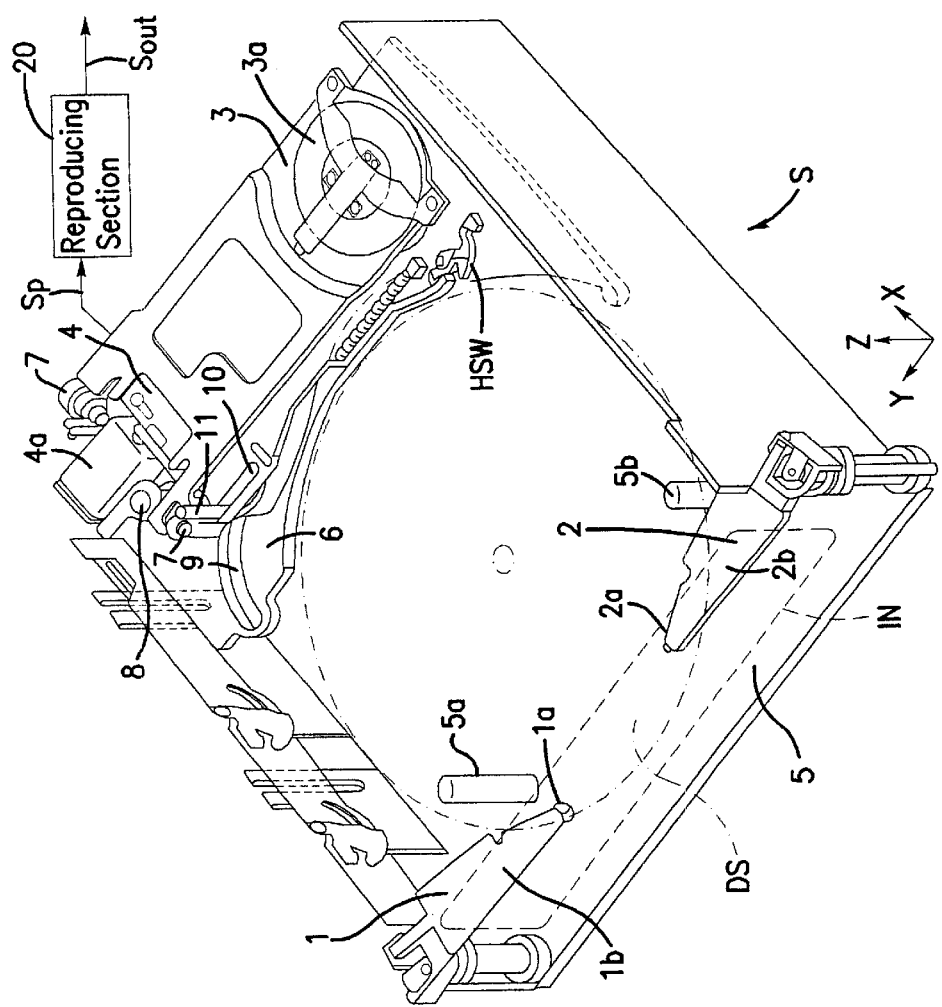

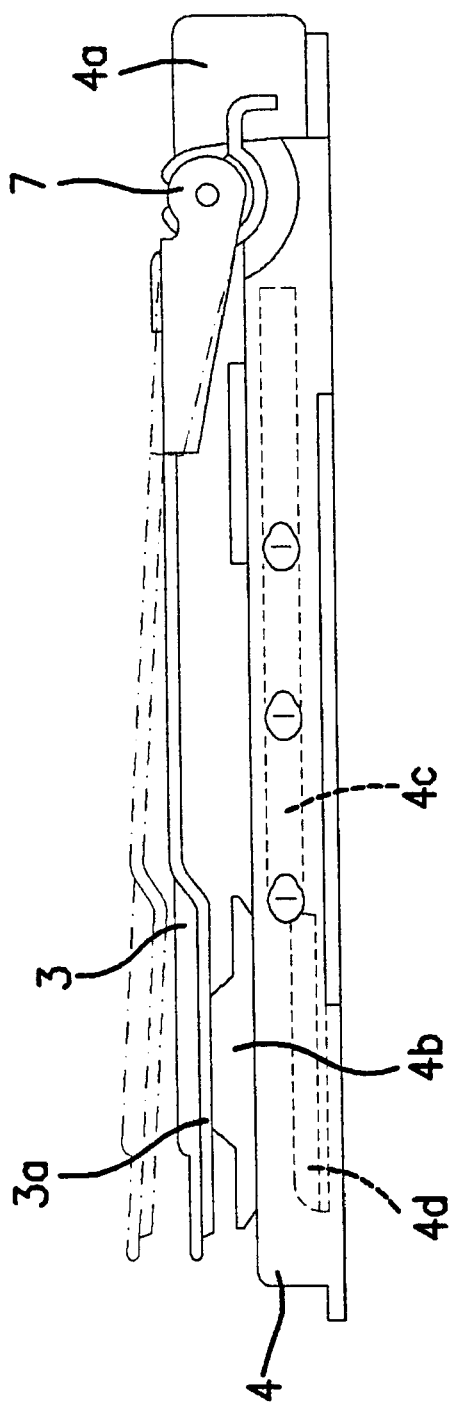

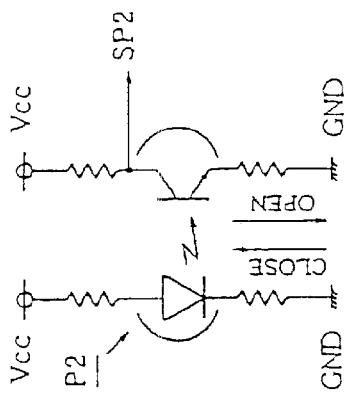
FIG. 5A
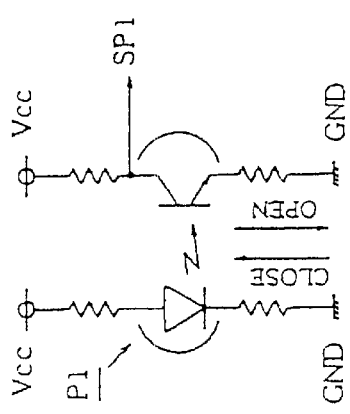
FIG. 5B
FIG. 5C
| | CLOSE | OPEN |
|---|---|---|
| SP1 | H | L |
| SP2 | H | L |
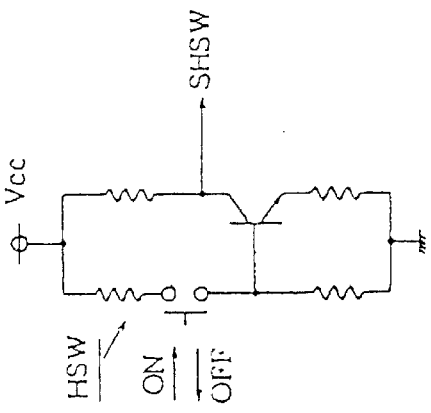
FIG. 5D
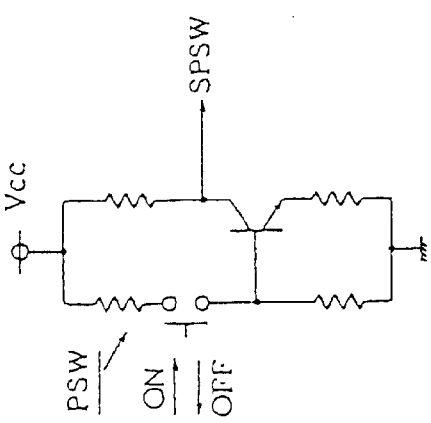
FIG. 5E
FIG. 5F
| | OFF | ON |
|---|---|---|
| SPSW | H | L |
| SHSW | H | L |

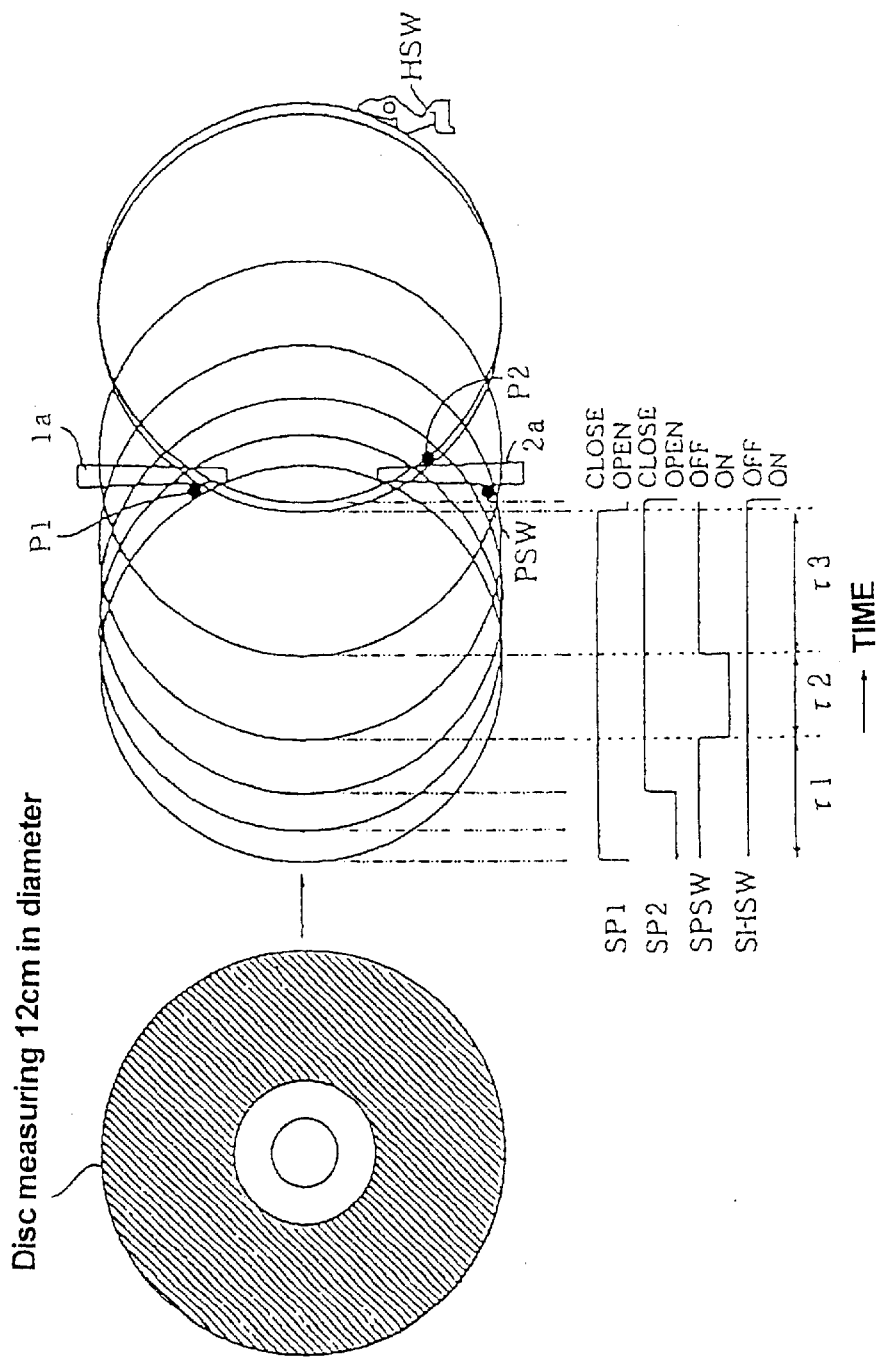

APPARATUS AND METHOD FOR DETECTING ABNORMAL INSERTION OF DISC BODY

BACKGROUND OF THE INVENTION

1. Field of the Invention

The present invention relates to the field of an apparatus for detecting abnormal insertion of a disc, an apparatus for holding the disc, an apparatus for reproducing information, and an apparatus for recording information. More specifically, an apparatus for detecting abnormal condition occurring when a disc-shaped recording medium for recording or reproducing information, such as CD (Compact Disc), DVD or the like, is inserted to a loading slot one-by-one. Moreover, an apparatus for holding the disc having the apparatus for detecting abnormal condition, an apparatus for reproducing information having the apparatus for holding the disc, and an apparatus for recording information having the apparatus for holding the disc.

2. Description of the Related Art

In a conventional information reproducing apparatus or information recording apparatus for using an optical disc, basically, reproducing information from only one optical disc, or recording information on only one optical disc are in common use.

On the other hand, there are two ways to insert the optical disc for reproducing information to the information reproducing apparatus or to insert the optical disc for recording information to the information recording apparatus.

The first one is the way to insert the optical disc by using a tray. In this way, the tray for holding the optical disc is pulled out horizontally when the optical disc is inserted. Then after setting the optical disc on the tray, the tray is horizontally moved to be inserted into the apparatus. The second one is the way to insert the optical disc by using driving rollers. In this way, at the time of recording information or reproducing information, a user tentatively insert the optical disc into the loading slot one by one to have the disc caught between carrying rollers. Then after having it caught, the disc in itself is horizontally moved by the rotation of the carrying rollers to be inserted to the apparatus.

In the two ways, the second way is the one for broadly using in a vehicle-installed information reproducing apparatus, a handy-sized information reproducing apparatus or the like. The second way is called "slot-in system" generally.

In the slot-in system, measures against a double insertion, which is the insertion that more than one disc are consecutively inserted, are generally taken. If the double insertion is occurred, for example, the destruction of a clamp system is occurred or the destruction of the optical discs double-inserted in themselves.

In a conventional way to prevent occurring the double insertion, for example, a member for shuttering the loading slot is set after the insertion of the first disc is finished, the insertion of the following disc is prevented by the member.

The insertion that two discs are completely overlapped and inserted is not the "double insertion" in this explanation. It is the "double insertion" in this explanation that as shown in FIG. 12 an optical disc 100 and an optical disc 101 are inserted having an partly overlapped area, namely, the two discs overlapped having plane shape with a character of eight.

In case of using the conventional measures against the above-mentioned double insertion, the member for shuttering the loading slot is set when the former disc is inserted to the predetermined position. Therefore the following disc may be destroyed by the member. In addition, the member in itself may be destroyed because its proper motion is prevented.

Moreover, in case of holding the disc in the state that the two discs are consecutively inserted in the above-mentioned way, the surface of the following disc may be damaged by contact with the clamp system for holding the disc, or the clamp system in itself may be damaged because its proper motion is prevented.

Further in so-called changer system that is available to hold a plurality of discs at the same time, if the two discs are consecutively inserted in the above-mentioned way, the following disc may be damaged when a reproducing section in the changer system is moved, or the reproducing section in itself may be damaged because its proper motion is prevented.

SUMMARY OF THE INVENTION

It is therefore an object of the present invention to provide an apparatus and a method for detecting an abnormal insertion of a disc body, which can certainly detect that a plurality of disc bodies like optical discs are consecutively inserted to a loading slot, and can prevent the disc bodies from destroying.

The above object of the present invention can be achieved by an apparatus for detecting the absence or the presence of the occurrence of the abnormal insertion that a plurality of disc bodies each of which should be inserted separately one by one are inserted consecutively. The apparatus has a passing detecting device for detecting the passing of the disc body, mounted on a passing route of the disc body, and a determining device for determining the occurrence of the abnormal insertion if the detecting device detects the passing again after the detecting device detected the passing once.

According to the apparatus of the present invention, a passing detecting device, which is mounted on a passing route of the disc body, detects the passing of the disc body. Then if the detecting device detects the passing again after the detecting device detected the passing, a determining device determines the occurrence of the abnormal insertion. Therefore, it is possible to detect certainly that a plurality of disc bodies are inserted consecutively, and to perform the following processing for avoiding the abnormal insertion.

In one aspect of the apparatus of the present invention, the passing detecting device has an. irradiating device and a disc body detecting device. The irradiating device irradiates a light beam on the passing route of the disc body. Then the disc body detecting device detects that the disc body passes through the passing route when the light beam is shielded. Therefore, it is possible to detect certainly that a plurality of disc bodies are inserted consecutively without no object contacts with the disc bodies.

In another aspect of the apparatus of the present invention, the passing detecting device includes a contact detecting device which detects that the disc body passes through the passing route if the disc body passing through the passing route contacts with the contact detecting device. Therefore, the passing is detected in a mechanical fashion, so that it is possible to detect certainly that a plurality of disc bodies are inserted consecutively.

In another aspect of the apparatus of the present invention, the passing detecting device further includes a holding device and a ejecting device. The holding device holds the disc body. Then if the determining device determines the occurrence of the abnormal insertion, the ejecting device ejects the disc body being inserted. Therefore, the disc body being inserted is ejected when the abnormal insertion is detected so that it is possible to prevent the disc bodies from destroying.

In another aspect of the apparatus of the present invention, the passing detecting device further includes a holding device and a announcing device. The holding device holds the disc body. If the determining device determines the occurrence of the abnormal insertion, the announcing device announces the occurrence of the abnormal insertion. Therefore, the occurrence of the abnormal insertion is announced so that it is possible to prevent the disc bodies from destroying and to prevent the abnormal state from being continued.

The above object of the present invention can be achieved by an apparatus for detecting the absence or the presence of the occurrence of the abnormal insertion that a plurality of disc bodies each of which should be inserted separately one by one are inserted consecutively. The apparatus has a passing detecting device for detecting a passing of the disc body, mounted on a passing route of the disc body, and a completion detecting device for detecting a completion of a carrying of the disc body when the disc body reaches a predetermined position after the disc body is inserted, and a determining device for determining the occurrence of the abnormal insertion if the detecting device detects the passing of the disc body when the completion detecting device detects the completion of the carrying of the disc body.

According to the apparatus of the present invention, the passing detecting device, which is mounted on a passing route of the disc body, detects a passing of the disc body. Then if the disc body reaches a predetermined position after the disc body is inserted, the completion detecting device detects a completion of a carrying of the disc body. Then if the detecting device detects the passing of the disc body when the completion detecting device detects the completion of the carrying of the disc body, the determining device determines the occurrence of the abnormal insertion. Therefore, it is possible to detect certainly that a plurality of disc bodies are inserted consecutively, and to perform the following processing for avoiding the abnormal insertion In one aspect of the apparatus of the present invention, the passing detecting device has an irradiating device and a disc body detecting device. The irradiating device irradiates a light beam on the passing route of the disc body. Then the disc body detecting device detects that the disc body passes through the passing route when the light beam is shielded. Therefore, it is possible to detect certainly that a plurality of disc bodies are inserted consecutively without no object contacts with the disc bodies.

In another aspect of the apparatus of the present invention, the passing detecting device includes a contact detecting device which detects that the disc body passes through the passing route if the disc body passing through the passing route contacts with the contact detecting device. Therefore, the passing is detected in a mechanical fashion, so that it is possible to detect certainly that a plurality of disc bodies are inserted consecutively.

In another aspect of the apparatus of the present invention, the passing detecting device further includes a holding device and a ejecting device. The holding device holds the disc body. Then if the determining device determines the occurrence of the abnormal insertion, the ejecting device ejects the disc body being inserted. Therefore, the disc body being inserted is ejected when the abnormal insertion is detected so that it is possible to prevent the disc bodies from destroying.

In another aspect of the apparatus of the present invention, the passing detecting device further includes a holding device and a announcing device. The holding device holds the disc body. If the determining device determines the occurrence of the abnormal insertion, the announcing device announces the occurrence of the abnormal insertion. Therefore, the occurrence of the abnormal insertion is announced so that it is possible to prevent the disc bodies from destroying and to prevent the abnormal state from being continued.

The above object of the present invention can be achieved by an apparatus for detecting the absence or the presence of the occurrence of the abnormal insertion that a plurality of disc bodies each of which should be inserted separately one by one are inserted consecutively. The apparatus has a passing detecting device for detecting a passing of the disc body, mounted on a passing route of the disc body, and a passing time detecting device for detecting a passing time when the passing detecting device detects the passing of the disc body, and a determining device for determining the occurrence of the abnormal insertion if the passing time is longer than the predetermined time corresponding to a size of the disc body.

According to the apparatus of the present invention, the passing detecting device, which is mounted on a passing route of the disc body, detects a passing of the disc body. Then the passing time detecting device detects a passing time when the passing detecting device detects the passing of the disc body. Then if the passing time is longer than the predetermined time corresponding to a size of the disc body, the determining device determines the occurrence of the abnormal insertion. Therefore, it is possible to detect certainly that a plurality of disc bodies are inserted consecutively, and to perform the following processing for avoiding the abnormal insertion.

In one aspect of the apparatus of the present invention, the passing detecting device has an irradiating device and a disc body detecting device. The irradiating device irradiates a light beam on the passing route of the disc body. Then the disc body detecting device detects that the disc body passes through the passing route when the light beam is shielded. Therefore, it is possible to detect certainly that a plurality of disc bodies are inserted consecutively without no object contacts with the disc bodies.

In another aspect of the apparatus of the present invention, the passing detecting device includes a contact detecting device which detects that the disc body passes through the passing route if the disc body passing through the passing route contacts with the contact detecting device. Therefore, the passing is detected in a mechanical fashion, so that it is possible to detect certainly that a plurality of disc bodies are inserted consecutively.

In another aspect of the apparatus of the present invention, the passing detecting device further includes a holding device and a ejecting device. The holding device holds the disc body. Then if the determining device determines the occurrence of the abnormal insertion, the ejecting device ejects the disc body being inserted. Therefore, the disc body being inserted is ejected when the abnormal insertion is detected so that it is possible to prevent the disc bodies from destroying.

In another aspect of the apparatus of the present invention, the passing detecting device further includes a holding device and a announcing device. The holding device holds the disc body. If the determining device determines the occurrence of the abnormal insertion, the announcing device announces the occurrence of the abnormal insertion. Therefore, the occurrence of the abnormal insertion is announced so that it is possible to prevent the disc bodies from destroying and to prevent the abnormal state from being continued.

The above object of the present invention can be achieved by a method of detecting the absence or the presence of the occurrence of the abnormal insertion that a plurality of disc bodies each of which should be inserted separately one by one are inserted consecutively. The method includes the processes as follows: detecting process for detecting the passing of the disc body on a passing route of the disc body, and determining process for determining the occurrence of the abnormal insertion if the process of detecting the passing again is performed after the process of detecting the passing was performed once.

According to the method of the present invention, the same advantageous effect of the aforementioned apparatus of the invention can be achieved.

In one aspect of the method of the present invention, the detecting process includes an irradiating process of irradiating a light beam on the passing route of the disc body, and a disc body detecting process of detecting that the disc body passes through the passing route when the light beam is shielded. According to the method of the present invention, the same advantageous effect of the aforementioned apparatus of the invention can be achieved.

In another aspect of the method of the present invention, the detecting process includes a contact detecting process which detects that the disc body passes through the passing route if the disc body passing through the passing route contacts with a contact detecting device. According to the method of the present invention, the same advantageous effect of the aforementioned apparatus of the invention can be achieved.

In another aspect of the method of the present invention, the detecting process further includes a holding process of holding the disc body, and a ejecting process of ejecting the disc body being inserted when the determining process determines the occurrence of the abnormal insertion. According to the method of the present invention, the same advantageous effect of the aforementioned apparatus of the invention can be achieved.

In another aspect of the method of the present invention, the detecting process further includes a holding process of holding the disc body, and a announcing process of announcing the occurrence of the abnormal insertion when the determining process determines the occurrence of the abnormal insertion. According to the method of the present invention, the same advantageous effect of the aforementioned apparatus of the invention can be achieved.

The above object of the present invention can be achieved by a method of detecting the absence or the presence of the occurrence of the abnormal insertion that a plurality of disc bodies each of which should be inserted separately one by one are inserted consecutively. The method includes the processes as follows: detecting a passing of the disc body, on a passing route of the disc body, and detecting a completion of a carrying of the disc body when the disc body reaches a predetermined position after the disc body is inserted, and determining the occurrence of the abnormal insertion if the detecting process detects the passing of the disc body when the completion detecting process detects the completion of the carrying of the disc body.

According to the method of the present invention, the same advantageous effect of the aforementioned apparatus of the invention can be achieved.

In one aspect of the method of the present invention, the detecting process includes an irradiating process of irradiating a light beam on the passing route of the disc body, and a disc body detecting process of detecting that the disc body passes through the passing route when the light beam is shielded. According to the method of the present invention, the same advantageous effect of the aforementioned apparatus of the invention can be achieved.

In another aspect of the method of the present invention, the detecting process includes a contact detecting process which detects that the disc body passes through the passing route if the disc body passing through the passing route contacts with a contact detecting device. According to the method of the present invention, the same advantageous effect of the aforementioned apparatus of the invention can be achieved.

In another aspect of the method of the present invention, the detecting process further includes a holding process of holding the disc body, and a ejecting process of ejecting the disc body being inserted when the determining process determines the occurrence of the abnormal insertion. According to the method of the present invention, the same advantageous effect of the aforementioned apparatus of the invention can be achieved.

In another aspect of the method of the present invention, the detecting process further includes a holding process of holding the disc body, and a announcing process of announcing the occurrence of the abnormal insertion when the determining process determines the occurrence of the abnormal insertion. According to the method of the present invention, the same advantageous effect of the aforementioned apparatus of the invention can be achieved.

The above object of the present invention can be achieved by a method of detecting the absence or the presence of the occurrence of the abnormal insertion that a plurality of disc bodies each of which should be inserted separately one by one are inserted consecutively. The method includes the processes as follows: detecting a passing of the disc body on a passing route of the disc body, and detecting a passing time when the passing detecting process detects the passing of the disc body, and determining the occurrence of the abnormal insertion if the passing time is longer than the predetermined time corresponding to a size of the disc body.

According to the method of the present invention, the same advantageous effect of the aforementioned apparatus of the invention can be achieved.

In one aspect of the method of the present invention, the detecting process includes an irradiating process of irradiating a light beam on the passing route of the disc body, and a disc body detecting process of detecting that the disc body passes through the passing route when the light beam is shielded. According to the method of the present invention, the same advantageous effect of the aforementioned apparatus of the invention can be achieved.

In another aspect of the method of the present invention, the detecting process includes a contact detecting process which detects that the disc body passes through the passing route if the disc body passing through the passing route contacts with a contact detecting device. According to the method of the present invention, the same advantageous effect of the aforementioned apparatus of the invention can be achieved.

In another aspect of the method of the present invention, the detecting process further includes a holding process of holding the disc body, and a ejecting process of ejecting the disc body being inserted when the determining process determines the occurrence of the abnormal insertion. According to the method of the present invention, the same advantageous effect of the aforementioned apparatus of the invention can be achieved.

In another aspect of the method of the present invention, the detecting process further includes a holding process of holding the disc body, and a announcing process of announcing the occurrence of the abnormal insertion when the determining process determines the occurrence of the abnormal insertion. According to the method of the present invention, the same advantageous effect of the aforementioned apparatus of the invention can be achieved.

BRIEF DESCRIPTION OF THE DRAWINGS

FIG. 1 is a perspective view of outline configuration of the information reproducing device in the embodiment;

FIG. 2 is a side view of the internal part of the information reproducing device showing the outline configuration;

FIG. 5A is a circuit diagram showing a specific configuration of a circuit for light-sensitive detector (No. 1);

FIG. 5B is a circuit diagram showing a specific configuration of a circuit for a light-sensitive detector (No. 2);

FIG. 5C is a circuit diagram showing a specific configuration of a circuit for a side switch;

FIG. 5D is a circuit diagram showing a specific configuration of a circuit for a home switch;

FIG. 5E is a truth table showing an operation of each light-sensitive detector;

FIG. 5F is a truth table showing an operation of the side switch and the home switch;

FIG. 6 is a graphical representation indicating the carrying operation of the optical disc;

DETAILED DESCRIPTION OF THE PREFERRED EMBODIMENT

Figure 3A:
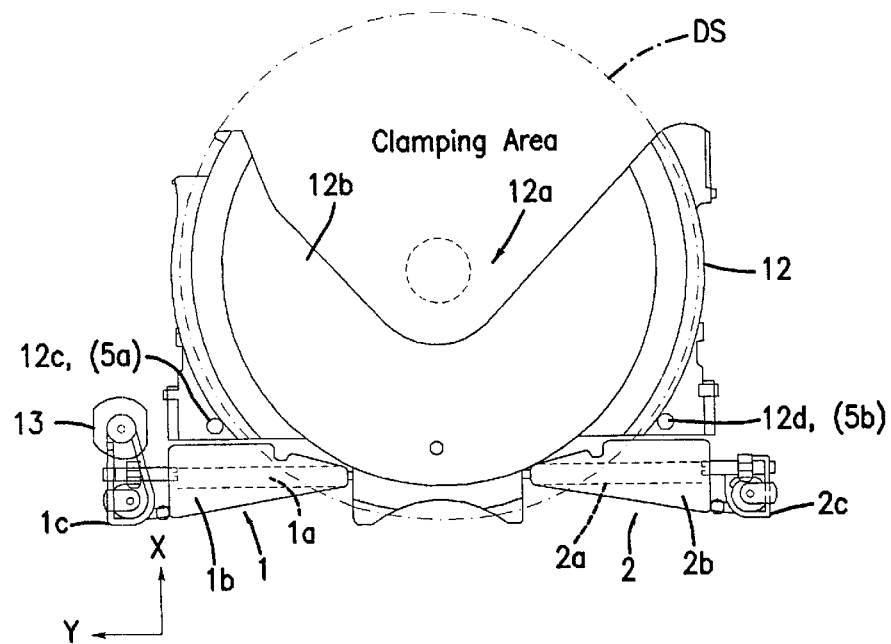
FIG. 3A is a plane view of the internal part of the information reproducing device showing the outline configuration (No. 1)

A preferred embodiment of the present invention will be explained with reference to the drawings.

In this embodiment, the present invention is adapted for the loading device, which loads CD or DVD (hereinafter simply referred to an optical disc) in an information reproducing device, in which the optical disc inserted from a loading slot in the slot-in system is pinched and held by a clamp system, and is rotated to reproduce information from the optical disc.

The First Embodiment

At first the first embodiment of the present invention will be explained with reference to FIGS. 1 to 8.

An entire configuration of the loading device as the information reproducing device will be explained with reference to FIGS. 1 to 3. FIG. 1 is a perspective view of outline configuration (except a casing portion) of the information reproducing device in the embodiment. FIG. 2 is a side view of the internal part of the information reproducing device showing the outline configuration. FIG. 3 is a plane view of the internal part of the information reproducing device showing the outline configuration.

As shown in FIG. 1, the information reproducing device S in the embodiment is provided with: a pair of carrying mechanisms 1, 2 which carries the optical disc DS, inserted from a loading slot IN mounted on a front panel of a casing (not shown), into a main body of the information reproducing device S by using the slot-in system, or ejects the optical disc DS, already held in the main body of the information reproducing device, out of the loading slot IN in the same slot-in system; a clamp mechanism 3 mounted on the back of the main body of the information reproducing device S; an otical pickup mechanism 4 mounted on the back side of the clamp mechanism 3 as overlapping it; a holding tray 12 (explained later) supported on a pair of column shafts 5a and 5b set up on a fixed chassis 5; a reproducing section 20 which performs reproduction processing, such as decode, to the detecting signal Sp outputted from the optical pickup mechanism 4, and generates reproduction signal Sout corresponding to recording information recorded on the optical disc DS, and outputs reproduction signal Sout to the external.

On the front panel, there are a shatter for opening and closing the loading slot IN driven by the predetermined drive mechanism, a display for displaying the status of the operation of the information reproducing device S, switches for being operated to have the information reproducing device perform in the desired state, and a disc guide on the carrying path between the loading slot IN and carrying mechanism 1, 2 for guiding the moving optical disc DS, while they are not shown in FIG. 1.

The clamp mechanism 3 and the optical pickup mechanism 4 are mounted on an another chassis 6 (hereinafter referred to a movable chassis 6) placed on the fixed chassis 5.

The clamp mechanism 3 is supported by a hinge mechanism 7 so that it can swing up and down (the direction of Z axis) on the optical pickup mechanism 4. The optical pickup mechanism 4 is supported by a supporting shaft 8 set up on one end of the movable chassis 6 so that it can swing about the supporting shaft 8 like a pendulum on a horizontal plane (X-Y plane in FIG. 1).

A guide axis 11 is inserted into a circular guide hole 9 made on the movable chassis 6 and a long hole 10 made on the optical pickup mechanism 4 so that it passes through the circular guide hole 9 and the long hole 10. The guide axis 11 is mounted on the fixed chassis 5 so that it can be stepped forward and backward to the predetermined direction by an actuator mechanism (not shown). Accordingly, when The guide axis 11 is stepped forward and backward, the clamp mechanism 3 and the optical pickup mechanism 4 are swung by the guide axis 11.

As shown in FIG. 2, a hub 3a for clamping shaped a nearly circular form is mounted on the back side of the clamp mechanism 3 which can swing. A turntable 4b is mounted on the optical pickup mechanism 4 as opposed to the hub 3a. The turntable 4b is rotated by a low-profile motor 4d such as a piezoelectric motor and the like so that it turns the disc DS.

Moreover, a main body of the optical pickup 4c is mounted on the optical pickup mechanism 4 so that it can move forward and backward horizontally in the direction of the turntable 4b.

At the top portion of the optical pickup mechanism 4, as shown in FIG. 1, a mechanical switch HSW (hereinafter referred to home switch) comprising a micro switch and the like is mounted.

The home switch HSW is used for sensing that the optical disc DS reaches the position to be clamped. If an inserted optical disc DS comes into contact with the home switch HSW, the home switch HSW senses that the inserted optical disc DS reaches the position to be clamped, and outputs a detecting signal $S_{HSW}$.

Structure of the disc carrying mechanisms 1, 2, and the holding tray 12, especially, its position and shape will be explained with reference to FIG. 3, which is a plane view. The holding tray 12 is mounted the disc carrying mechanisms 1, 2, and the optical pickup mechanism 4 and the clamp mechanism 3.

As shown in FIG. 3, the holding tray 12 is a board shaped structural component having a holding plate 12b on which a notch 12a is made.

Through holes 12c, 12d in which column shafts 5a and 5b are inserted are made on the both sides of the holding plate 12b.

The disc carrying mechanisms 1, 2 are mounted on the both sides of the loading slot IN of the holding tray 12.

Figure 3B:
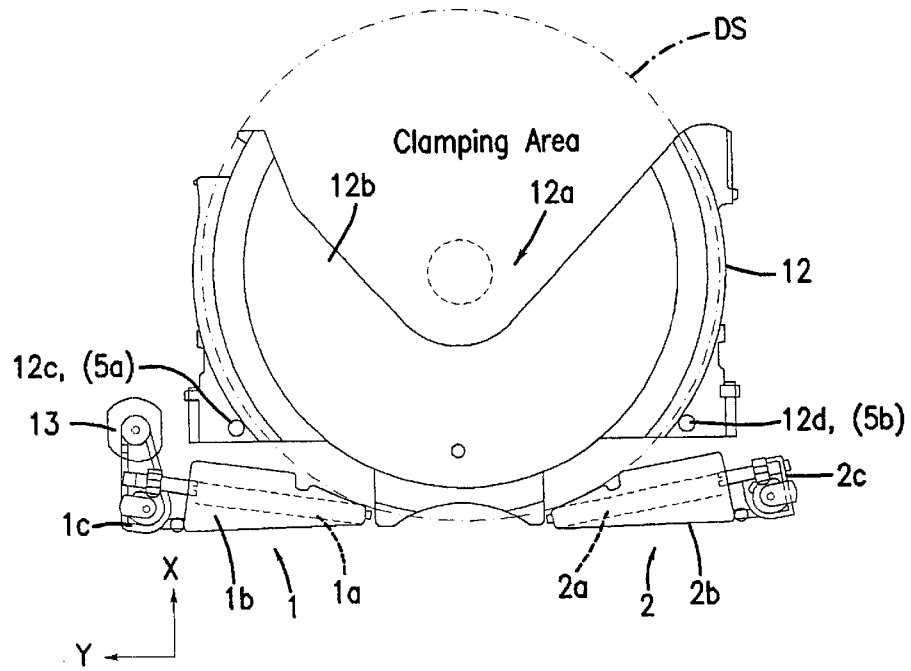
FIG. 3B is a plane view of the internal part of the information reproducing device showing the outline configuration (No. 2)

The disc carrying mechanisms 1, 2 nearly parallel Y axis in FIG. 3A at the time of loading (inserting the optical disc DS) and unloading (ejecting the optical disc DS). On the other hand, at the time of holding the optical disc DS in the holding tray 12, as shown in FIG. 3B they are turned to the direction of the loading slot IN, and become standby state.

The disc carrying mechanisms 1, 2 include carrying rollers 1a, 2a, flat plane shaped contact components 1b, 2b mounted above the carrying rollers 1a, 2a. A power of a driving motor 13 is transmitted to the carrying rollers 1a, 2a through a power transmission mechanism 1c, 2c comprising a gear mechanism and a belt mechanism so that the carrying rollers 1a, 2a rotate.

The carrying rollers 1a, 2a rotate in the normal direction of rotation at the loading so that the optical disc DS is carried into the holding tray 12. On the other hand, the carrying rollers 1a, 2a rotate in the reverse direction of rotation at the unloading so that the optical disc DS is ejected from the holding tray 12.

The carrying rollers 1a, 2a are controlled to be rotated and stopped with synchronous timing. Each of The carrying rollers 1a, 2a is shaped like a frustum whose opposed end side becomes gradually thin toward the end side. Consequently, the carrying rollers 1a, 2a move the optical disc DS to the center of a carrying path (this motion is generally called "centering") and carry it.

If a user inserts the optical disc DS into the loading slot IN, the carrying roller 1a and the contact component 1b, and the carrying roller 2a and the contact component 2b work together so that they pinch the optical disc DS while loading it. Consequently, the optical disc DS is held in the holding tray 12.

After that, if the user select the reproduction of recorded information on the optical disc DS by pressing the operation switch, the optical pickup mechanism 4 and the clamp mechanism 3 go into the notch 12a of the holding tray 12 in the state that the clamp mechanism 3 turns up a little against the optical pickup mechanism 4.

Then the clamp mechanism 3 turns down toward the optical pickup mechanism 4, and clamps the optical disc DS between the hub 3a and the turntable 4b. After that, the recorded information is read by the main body 4c of the optical pickup mechanism 4 using an optical reading scheme. Consequently, the detecting signal Sp is generated, and then the decode processing in the reproducing section 20 (the generate processing of the reproduction signal Sout) is performed.

After that, if the user select the ejection of the optical disc DS already held in the holding tray 12 by pressing the operation switch, the carrying roller 1a, 2a pinch the optical disc DS while unloading it in the state that the optical pickup mechanism 4 and the clamp mechanism 3 return a desired standby position shown in FIG. 1. Consequently, the optical disc DS is ejected toward the loading slot IN.

The control mechanism for controlling the disc carrying mechanism 1, 2 having the above-mentioned configuration will be explained with reference to FIGS. 4 to 8.

Figure 4:
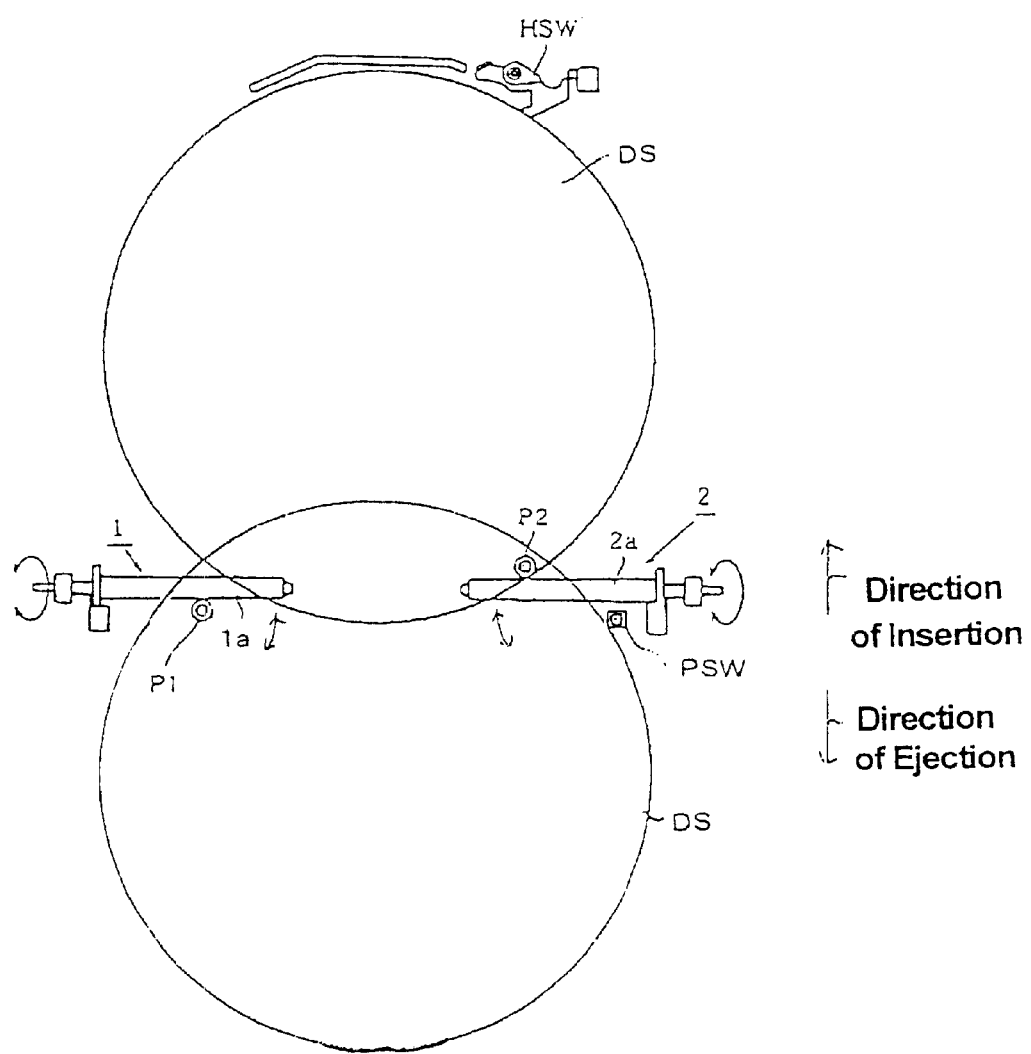
FIG. 4 is a plane view for explaining the operation of the control mechanism.
Figure 7:
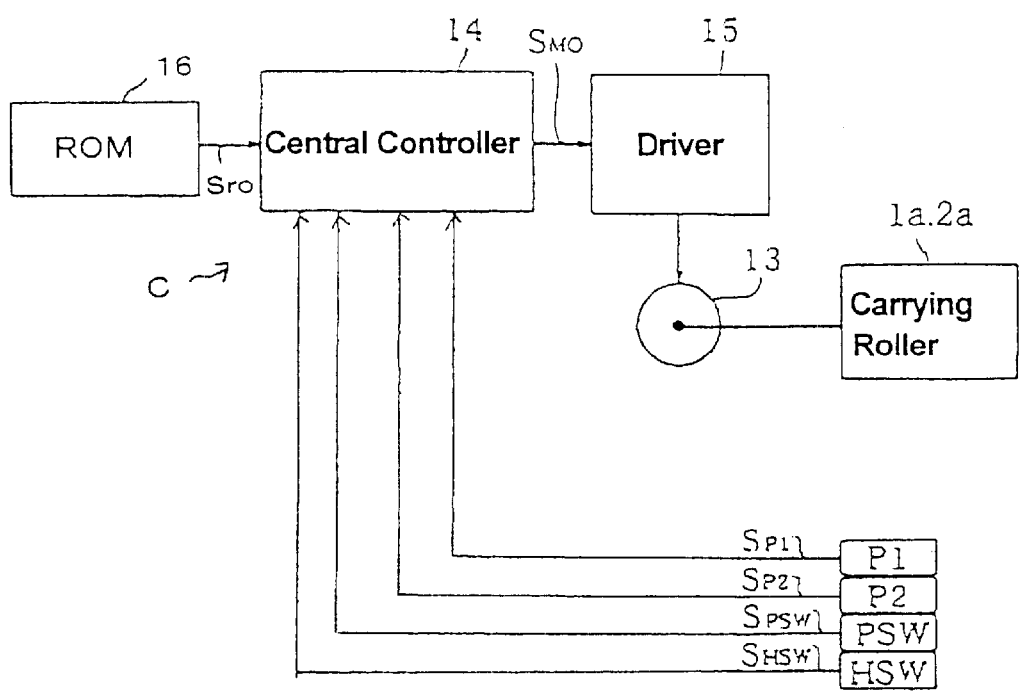
FIG. 7 is a block diagram showing a circuit for controlling the insertion or the ejection of the optical disc.
Figure 8:
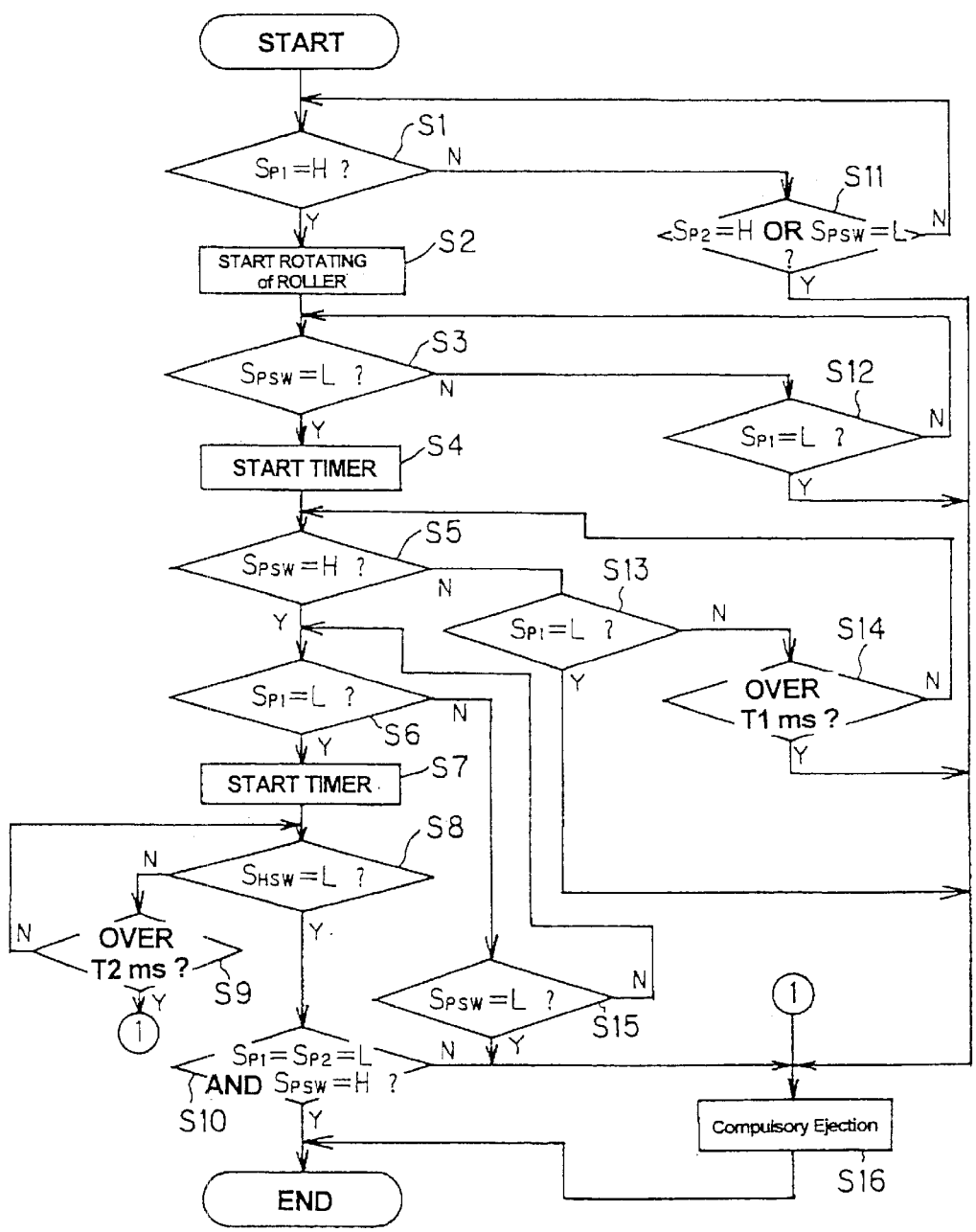
FIG. 8 is a flow chart showing the control processing at the time of loading and unloading in the present invention.

FIG. 4 is a plane view for explaining the operation of the control mechanism. FIG. 5 is a circuit diagram showing a specific configuration of a circuit for each switch. FIG. 6 is a graphical representation indicating the relationship between the motion of the optical disc DS at the time of carrying it into the tray and the signal outputted from each switch or each light-sensitive detector. FIG. 7 is a block diagram showing a circuit performing actual control operation. FIG. 8 is a flow chart showing the control processing at the time of loading and unloading in the present invention.

As shown in a plane view of FIG. 4, in addition to the above-mentioned home switch, in the information reproducing device, a light-sensitive detector P1 is mounted in front of the carrying roller 1a, and a light-sensitive detector P2 is mounted in front of the carrying roller 2a. Moreover, a mechanical switch PSW such as a micro switch or the like (hereinafter referred to a side switch) is mounted along the carrying surface of the carrying roller 2a.

The light-sensitive detectors P1 and P2 are mounted at a smaller distance than the diameter of the optical disc DS.

The light-sensitive detector P1 is used for mainly detecting the insertion of the optical disc DS into the loading slot IN to start rotating for the carrying roller 1a, 2a. On the other hand, the light-sensitive detector P2 is used for mainly detecting the passing of the end side of the optical disc DS at the time of unloading to stop rotating for the carrying roller 1a, 2a.

The side switch PSW is mounted at the position where one end of the outer region of the optical disc DS can be contacted with it when the optical disc DS is pinched between the carrying roller 1a, 2a and the contact component 1b, 2b while being carried.

As shown in the circuit diagrams of FIGS. 5A and 5B, photo-interrupter having a photodiode and a phototransistor opposed each other is adapted for the light-sensitive detectors P1 and P2. As shown in truth table of FIG. 5C, if an object such as the optical disc DS or the like is passed through between the photodiode and the phototransistor (hereinafter this state is referred to "close state"), the voltage level of each detecting signal $S_{P1}$, $S_{P2}$ becomes "H (High)" level. If no object is passed through between the photodiode and the phototransistor (hereinafter this state is referred to "open state"), the voltage level of each detecting signal $S_{P1}$, $S_{P2}$ becomes "L (Low)" level.

The side switch PSW and home switch HSW, as shown in the circuit diagram of FIG. 5d and 5e, includes a normally open typed micro switch and a transistor. As shown in truth table of FIG. 5F, if the object such as the optical disc or the like is not contacted with the micro switch (hereinafter this state is referred to OFF state), the voltage level of each detecting signal $S_{PSW}$, $S_{HSW}$ becomes "H (High)" level. If the object such as the optical disc or the like is contacted with the micro switch (hereinafter this state is referred to ON state), the voltage level of each detecting signal $S_{PSW}$, $S_{HSW}$ becomes "L (Low)" level.

In the embodiment, a transmission light-sensitive detector, which senses the interception or the transmission of a light beam corresponding to the presence or the absence of the object such as the optical disc DS or the like, is used as each the light-sensitive detector P1, P2. However, a reflection light-sensitive detector, which irradiates the object with the light beam and receives the reflected light from the object to detect the presence or the absence of the object such as the optical disc DS or the like, may be used as each the light-sensitive detector P1, P2.

Next, variations in the detecting signal outputted from each switch and the light-sensitive detector while the optical disc DS is correctly carried to the proper clamp position after the optical disc DS is inserted one by one into the loading slot IN by a user.

If one optical disc DS is inserted into the loading slot IN while it is caught by the user, as shown in FIG. 6, the state of the light-sensitive detector P1 is change from the OPEN state to the CLOSE state so that the level of the detecting signal $S_{P1}$ changes from L level to H level. That change of the light-sensitive detector P1 causes the carrying rollers 1a and 2a to start rotating, so that carrying the optical disc DS into the information reproducing device S is begun.

If the outer edge of the optical disc DS reaches the position of the light-sensitive detector P2 while the optical disc DS is carried, the state of the light-sensitive detector P2 changes from the OPEN state to the CLOSE state so that the voltage level of the detecting signal $S_{P2}$ changes from L level to H level.

As mentioned already, the light-sensitive detector P2 is used for stopping the rotation of the carrying roller 1a, 2a at the time of unloading. Therefore, if the voltage level of the detecting signal $S_{P2}$ changes from L level to H level, no operation is begun.

If the outer edge of the optical disc DS reaches the contact position of the side switch PSW while the optical disc DS is carried, the state of the the side switch PSW changes from the OFF state to the ON state so that the voltage level of the detecting signal $S_{PSW}$ changes from H level to L level. That change of the voltage level of the detecting signal $S_{PSW}$ causes the central controller 14 to find that the optical disc DS is presently passing through the loading slot IN.

If the opposite side of the outer edge reaches the contact position of the side switch PSW while the optical disc DS is carried, the state of the contact between the optical disc DS and the side switch PSW which is continued so far comes to end. Consequently, the state of the aide switch PSW changes from the ON state to the OFF state so that the voltage level of the detecting signal $S_{PSW}$ changes from L level to H level. That change of the voltage level of the detecting signal $S_{PSW}$ causes the central controller 14 to find that the passing of the optical disc DS is finished.

The voltage level of the detecting signals $S_{P1}$ and $S_{P2}$ is still H level.

If the opposite side of the outer edge reaches the position of the light-sensitive detector P1 while the optical disc DS is carried, the state of the light-sensitive detector P1 is change from the CLOSE state to the OPEN state. Consequently, the voltage level of the detecting signal $S_{P1}$ changes from H level to L level.

As mentioned already, the light-sensitive detector P1 is used for starting the rotation of the carrying roller 1a, 2a at the time of loading. Therefore, if the voltage level of the detecting signal $S_{P1}$ changes from H level to L level, no operation is begun.

If the optical disc DS reaches the clamp position, namely, the position where the optical disc DS contacts the home switch HSW while the optical disc DS is carried, the state of the home switch changes from OFF state to ON state so that the voltage level of the detecting signal $S_{HSW}$ changes from H level to L level. That change of the voltage level of the detecting signal $S_{HSW}$ causes the central controller 14 to find that the optical disc DS reaches the clamp position and can be clamped.

The state of the light-sensitive detector P2 changes from the CLOSE state into the OPEN state, so that the voltage level of the detecting signal $S_{P2}$ changes from H level into L level.

At the time of unloading the optical disc from the information reproducing device S, each detecting signal reversely changes with time as compared with each detecting signal changing with time when the loading of the optical disc is executed.

Namely, if the ejection of the held optical disc DS is begun, the state of the home switch HSW changes from the ON state into the OFF state so that the voltage level of the detecting signal $S_{HSW}$ changes from L level into H level. In the same time, the state of the the light-sensitive detector P2 changes from the OPEN state into the CLOSE state, so that the voltage level of the detecting signal $S_{P2}$ changes from L level into H level.

If the outer edge of optical disc DS reaches the position of the light-sensitive detector P1 while the optical disc DS is ejected, the state of the light-sensitive detector P1 changes from the OPEN state into the CLOSE state so that the voltage level of the detecting signal $S_{P1}$ changes from L level into H level.

Then if the outer edge of optical disc DS reaches the position where it contacts with the side switch PSW while the optical disc DS is ejected, the state of the side switch PSW changes from OFF state into ON state so that the voltage level of the detecting signal $S_{PSW}$ changes from H level into L level. That change of the voltage level of the detecting signal $S_{PSW}$ causes the central controller 14 to find that the optical disc DS is presently being ejected from the loading slot IN.

If the opposite side of the outer edge reaches the position where it contacts with the side switch PSW while the optical disc DS is ejected, the state of the contact between the optical disc DS and the side switch PSW which is continued so far comes to end. Consequently, the state of the side switch PSW changes from the ON state into the OFF state so that the voltage level of the detecting signal $S_{PSW}$ changes from L level to H level. That change of the voltage level of the detecting signal $S_{PSW}$ causes the central controller 14 to find that the ejection of the optical disc DS from the loading slot IN is finished.

The voltage level of the detecting signals $S_{P1}$ and $S_{P2}$ is still H level.

Then if the end of the outer edge reaches the position of the light-sensitive detector P2 while the optical disc DS is ejected, the state of the light-sensitive detector P2 changes from the CLOSE state into the OPEN state so that the voltage level of the detecting signal $S_{P2}$ changes from H level into L level.

That change of the voltage level of the detecting signal $S_{P2}$ causes the carrying rollers 1a and 2a to stop rotating, so that the ejection of the optical disc DS from the loading slot IN is finished.

After that, the ejected optical disc DS is carried out of the loading slot by the user, the state of the light-sensitive detector P1 changes from the CLOSE state into the OPEN state so that the voltage level of the detecting signal $S_{P1}$ changes from H level into L level.

As mentioned already, the light-sensitive detector P1 is used for starting the rotation of the carrying roller 1a, 2a at the time of loading. Therefore, if the voltage level of the detecting signal $S_{P1}$ at the time of unloading changes from H level to L level, no operation is begun.

Next, the configuration and the operation of the control circuit which has the carrying rollers 1a and 2a rotate and controls the insertion of the optical disc DS into the information reproducing device S and the ejection of that from the information reproducing device S will be explained with referred to FIGS. 7 to 8.

The control circuit is installed on a electrical circuit board mounted on the back side of the fixed chassis 5.

As shown in FIG. 7, the control circuit includes a determining device having a micro processor (MPU), the central controller 14, a driver 15 which provides power to the driving motor 13, which drives the carrying roller 1a and 2a, based on a controlling signal $S_{MO}$ from the central controller 14, and ROM16 storing program using for the processing of the central controller 14 at the time of loading and unloading.

The entire operation will be explained.

The central controller 14 generates the controlling signal $S_{MO}$ to control the rotation of the carrying rollers 1a and 2a through the driver 15 based on the detecting signals $S_{P1}$, $S_{P2}$, $S_{PSW}$, and $S_{HSW}$ outputted from each of the light-sensitive detector P1 and P2, the side switch PSW, and the side switch HSW so that the loading and the unloading of the optical disc DS is executed. Then central controller 14 controls the driver 15.

At the time, the program for the control of the rotation in the central controller 14 is read from ROM 16 as a ROM signal $S_{r0}$ by the central controller 14, and is used for the control.

Then the driver 15 drives the carrying roller 1a and 2a as mentioned already based on the controlling signal $S_{MO}$.

Next, the process of preventing a double insertion of the optical disc performed under the control of the rotation by the central controller 14 will be explained with reference to FIG. 8.

The program corresponding to the flow chart shown in FIG. 8 is previously stored in ROM 16. If the program is read as the ROM signal Sr0 by the central controller 14 at the time of loading, the following process of the control of the rotation is performed.

As shown in FIG. 8, in the process of preventing a double insertion of the optical disc, if the loading is begun, it is determined whether the voltage level of the detecting signal SP1 changes from L level into H level, namely, whether the optical disc DS is inserted into the loading slot IN by the user (Step S1). The optical disc is a CD (Compact Disc) or a DVD, and it is 12 cm in diameter.

Then if the voltage level of the detecting signal $S_{P1}$ does not change from L level into H level (Step S1; N), it is determined that the optical disc DS is not inserted in the loading slot IN yet. Next, it is determined whether the level of the detecting signal $S_{P2}$ changes from L level into H level, or whether the level of the detecting signal $S_{PSW}$ changes from H level into L level, namely, whether the state of the light-sensitive detector P2 changes from the OPEN state into the CLOSE state, or whether the state of the side switch PSW changes from the OFF state into the ON state (Step S11).

If the level of the detecting signal $S_{P2}$ does not change from L level into H level and the level of the detecting signal $S_{PSW}$ changes from H level into L level (Step S1; No), it is determined that no object is inserted into the loading slot IN. Then the waiting process is performed as shown in Step S1 of FIG. 1

On the other hand, in the determination at the Step S11, if the level of the detecting signal $S_{P2}$ does not change from L level into H level or the level of the detecting signal $S_{PSW}$ changes from H level into L level (Step S11; Yes), it is determined that the object except for the optical disc DS, for example, a small CD whose diameter is 8 cm or the other foreign material is inserted in the loading slot IN. Then the carrying rollers 1a and 2a are rotated backward to eject the object compulsorily (Step S16), and the loading is finished.

In the determination at the Step S1, if the level of the detecting signal $S_{P1}$ changes from L level into H level (Step S1; Y), it is determined that the optical disc DS is inserted in the loading slot IN. Then the carrying rollers 1a and 2a are rotated forward, and the actual process of loading (the process of carrying the optical disc DS into the loading slot IN) is begun (Step S2).

After the loading is begun, it is determined whether the level of the detecting signal $S_{PSW}$ changes from H level into L level, namely, the optical disc DS is carried to the position where the optical disc DS contacts with the side switch PSW (Step S3).

If the level of the detecting signal $S_{PSW}$ does not change from H level into L level (Step S3; N), it is determined that the optical disc is not carried to the position of the side switch PSW. Then it is determined whether the level of the detection signal $S_{P1}$ changes H level into L level, namely, whether the state of the light-sensitive detector P1 changes from the CLOSE state into the OPEN state (Step S12). If the loading of the optical disc DS is correctly executed, the above-mentioned changes can not occur.

If the level of the detecting signal $S_{P1}$ does not change from H level into L level (Step S12; N), it is determined that the optical disc DS does not reach the position of the side switch PSW yet and the loading operation is not finished yet. Then the process shown in the Step S3 and the following processes are performed to continue the loading operation.

On the other hand, in the determination shown in Step S12, if the level of the detecting signal $S_{P1}$ changes from H level into L level (Step S12; Y), it is determined that the object having the size that it does not reach the position of the side switch PSW and the position of the light-sensitive detector P1 (for example, a small CD whose diameter is 8 cm or the other foreign material) is carried. Then the carrying rollers 1a and 2a are rotated backward to eject the object compulsorily (Step S16), and the loading is finished.

Next, in the determination shown in Step S3, if the level of the detecting signal $S_{PSW}$ changes from H level into L level (Step S3; Y), it is determined that the optical disc DS is carried to the position where it contacts with the side switch PSW. Then counting by a timer is started (Step S4). The timer counts the time when the state of the side switch PSW keeps the ON state, namely, the time when the optical disc DS passes through the position of the side switch PSW.

After the counting by the timer is started, it is determined whether the level of the detecting signal $S_{PSW}$ changes from L level into H level, namely, whether the optical disc DS finishes passing through the position of the side switch PSW (Step S5).

If the level of the detecting signal $S_{PSW}$ does not change from L level into H level (Step S5; N), it is determined that the optical disc DS is passing through the position of the side switch PSW. Then it is determined whether the level of the detecting signal $S_{P1}$ changes from H level into L level, namely, the state of the light-sensitive detector P1 changes the CLOSE state into the OPEN state (Step S13). If the loading of the optical disc DS is correctly executed, the above-mentioned changes can not occur.

If the level of the detecting signal $S_{P1}$ does not change from H level into L level (Step S13; N), it is determined that the optical disc passes through the position of the side switch PSW. Then it is determined whether elapsed time in the time counting reaches the predetermined T1 ms (Step S14). The T1 ms is equal to the time when the optical disc DS can pass through the position of the side switch PSW in the case that the loading of the optical disc DS is executed in normal speed.

In the determination shown in Step S14, if the time when the timer counts is under T1 ms (Step S14; N), it is determined that the loading is correctly performed. Then the process shown in Step S5 and the following processes are performed to continue the loading operation.

On the other hand, in the determination shown in Step S14, if the time when the timer counts is over T1 ms (Step S14; Y), it is determined that the object having the length which is longer than the distance necessary to pass through the position of the side switch PSW for the optical disc DS is inserted (specifically, the double insertion is occurred). Then the carrying rollers 1a and 2a are rotated backward to eject the object compulsorily (Step S16), and the loading is finished. Consequently, the later disc DS in the two discs which are doubly inserted is compulsorily ejected.

In the determination shown in Step S13, if the level of the detecting signal $S_{P1}$ changes from H level into L level (Step S13; Y), it is determined that the object having the size that it can reach the position of the side switch PSW but it can not reach the position of the light-sensitive detector P1 (for example, a small CD whose diameter is 8 cm or the other foreign material) is carried. Then the carrying rollers 1a and 2a are rotated backward to eject the object compulsorily (Step S16), and the loading is finished.

Next, in the determination shown in Step S5, if the level of the detecting signal $S_{PSW}$ changes from L level into H level (Step S5; Y), it is determined that the optical disc DS has passed through the position of the side switch PSW. Then it is determined whether if the level of the detecting signal $S_{P1}$ changes from H level into L level, namely, whether the optical disc DS has correctly passed through the position of the light-sensitive detector P1 and is carried (Step S6).

If the level of the detecting signal $S_{P1}$ does not change from H level into L level (Step S6; N), it is determined that the optical disc DS is passing through the position of the light-sensitive detector P1. Then it is determined whether the level of the detecting signal $S_{PSW}$ changes from H level into L level, namely, whether the state of the side switch changes the OFF state into the ON state (Step S15). In the case that the later disc DS in the doubly inserted discs is inserted or the other foreign material is inserted, the state of the side switch changes the OFF state into the ON state. If the loading of the optical disc DS is correctly executed, the change can not occur.

If the level of the detecting signal $S_{PSW}$ does not change from H level into L level (Step S15; N), it is determined that the loading of the optical disc DS is correctly executed. Then the process shown in the Step S6 and the following processes are performed to continue the loading operation.

On the other hand, in the determination shown in the Step S15, if the level of the detecting signal $S_{PSW}$ changes from H level into L level (Step S15; Y), as mentioned already, it is determined that the double insertion occurs or the other foreign material is inserted. Then the carrying rollers 1a and 2a are rotated backward to eject the object compulsorily (Step S16), and the loading is finished. Consequently, the later disc DS in the two discs which are doubly inserted is compulsorily ejected.

On the other hand, in the determination shown in the Step S6, if the level of the detecting signal $S_{P1}$ changes from H level into L level (Step S6; Y), it is determined that the optical disc DS has correctly passed through the position of the light-sensitive detector P1. Then clocking by the other timer in the central controller 14 (not shown) is started (Step S7). The other timer clocks the time when the state of the home switch HSW changes from the OFF state into the ON state after the level of the detecting signal $S_{P1}$ changes from H level into L level, namely, when the optical disc DS reached the position of the home switch HSW after it passed through the position of the light-sensitive detector P1.

After the clocking by the other timer is started, it is determined whether the level of the detecting signal $S_{HSW}$ changes from H level into L level, namely, whether the carrying of the optical disc DS into the clamp position has correctly finished, and whether the state of the home switch HSW changes from the OFF state into the ON state (Step S8). Then if the level of the detecting signal $S_{HSW}$ does not change from H level into L level (Step S8; N), it is determined that the optical disc DS has not reached the clamp position yet after it passed through the position of light-sensitive detector P1. Then it is determined whether the lapse time in the other timer reaches the predetermined T2 ms (Step S9). The T2 ms is equal to the time when the optical disc DS can reach the position of the home switch HSW after it passed through the position of the light-sensitive detector P1 in the case that the loading of the optical disc DS is executed in normal speed.

In the determination shown in the Step S9, if the lapse time is under the T2 ms (Step S9; N), it is determined that the loading of the optical disc DS is correctly executed. Then the process shown in the Step S8 and the following processes are performed to continue the loading operation.

On the other hand, in the determination shown in the Step S9, if the lapse time is over the T2 ms (Step S9; Y), it is determined that the optical disc DS has not reached the position of the home switch HSW although it passed through the position of of the light-sensitive detector P1, namely, that the optical disc DS has stopped on the way of loading by any problem. Then the carrying rollers 1a and 2a are rotated backward to protect the optical disc DS (Step S16). Consequently, it is compulsorily ejected and the loading is finished.

If the level of the detecting signal $S_{HSW}$ changes from H level into L level (Step S8; Y), it is determined that the carrying of the optical disc DS into the clamp position is correctly finished. Then it is determined whether the level of the detecting signals $S_{P1}$ and $S_{P2}$ are L level and the level of the detecting signal $S_{PSW}$ is H level, namely whether the states of the light-sensitive detectors P1, P2 are the OPEN state because the carrying of the optical disc DS into the clamp position is correctly finished, and whether the state of the side switch PSW is the OFF state (Step S10).

In the determination shown in the Step S10, if the level of the detecting signals $S_{P1}$ and $S_{P2}$ are not L level or the level of the detecting signal $S_{PSW}$ is not H level (Step S10; N), it is determined that the state of at least each of the light-sensitive detectors P1, P2 is the CLOSE state because of the later disc DS in the doubly inserted or the other foreign material, or the state of the side switch PSW is the ON state. Then the carrying rollers 1a and 2a are rotated backward to eject the object compulsorily (Step S16). Consequently, the loading is finished.

On the other hand, in the determination shown in the Step S10, if the level of the detecting signals $S_{P1}$ and $S_{P2}$ are L level and the level of the detecting signal $S_{PSW}$ is H level (Step S10; Y), it is determined that the carrying of the optical disc DS into the clamp position is correctly finished. Then the loading is finished.

After that, the light beam for reproducing information is irradiate to the information recording surface of the optical disc DS by the main body 4c of the optical pickup. Then the the main body 4c of the optical pickup receives the reflection from the surface so that the detecting signal $S_P$ is generated. Consequently, the decoding operation is performed by the reproducing section 20.

As explained above, according to the loading by the information reproducing device S in the first embodiment, if the passing of the optical disc DS is detected again after the passing was detected once, it is determined that the double insertion or insertion of the foreign material occur. Consequently, the state of the double insertion or insertion of the foreign material can be certainly detected.

Further, it is determined that the double insertion or insertion of the foreign material occur, if it is detected that the optical disc DS is passing through the loading slot IN at the same time when the finishing of the loading of the optical disc DS is detected. Consequently, the state of the double insertion or insertion of the foreign material can be certainly detected.

Moreover, it is determined that the double insertion or insertion of the foreign material occur, if the time when it is detected that the optical disc DS is passing through the loading slot is longer than the predetermined T1 ms. Consequently, the state of the double insertion or insertion of the foreign material can be certainly detected.

Furthermore, the contact of the optical disc DS with the home switch HSW is detected in a mechanical fashion so that the contact is can be certainly detected and it can be certainly detected that the optical disc DS reached the clamp position.

Further, the later disc DS which is being inserted is ejected if the double insertion is detected, so that the continuation of the double insertion and the destruction of the optical disc DS can be certainly prevented.

Moreover, the double insertion of the optical disc DS is certainly detected, so that the protection of the information reproducing device S can be achieved.

In the above-mentioned first embodiment, if the double insertion or the insertion of the foreign material is detected, the optical disc or the foreign material is compulsorily ejected. In addition, if the occurrence of the double insertion or the insertion of the foreign material is detected, the announcement of that may be performed by the control of the central controller 14. Specifically, the announcement may be performed by a display, a sound or the like. According to the configuration, the announcement is performed if the occurrence of the double insertion or the insertion of the foreign material is detected, so that the continuation of the double insertion or the insertion of the foreign material and the destruction of the optical disc DS can be certainly prevented.

In the above-mentioned first embodiment, a mechanical switch such as a micro switch is used as the side switch PSW which detects the passing of the optical disc DS. In addition, a photo-interrupter, which includes a photodiode and a phototransistor opposed each other, as the same as the one used in the the light-sensitive detectors P1, P2, can be used as the side switch PSW. In this case, it is determined that the optical disc is passing through the loading slot if the state of the photo-interrupter as the side switch PSW is the CLOSE state. Consequently, the passing of the optical disc DS can be detected and the double insertion or the insertion of the foreign material can be certainly detected without no object does not contact with the optical disc DS.

However, using the photo-interrupter as the side switch PSW is effective only in the case that the optical disc DS is the one which is a CD or a DVD as mentioned above, namely, the one having the reflective surface, which reflects the light beam from the photodiode in the photo-interrupter, on almost entire surface of the disc which is 12 cm in diameter. It is impossible to use a so-called "maxi-single disc", which is standardized in recent years and has the reflective surface only on the center part measuring 8 cm in diameter in the entire surface measuring 12 cm in diameter, because the light beam may pass through the surface according to the setting position of the side switch comprising the photo-interrupter.

The Second Embodiment

Next, the second embodiment of the present invention will be explained with reference to FIG. 9.

As mentioned above, in the first embodiment, in the case that two optical discs DS measuring 12 cm in diameter are consecutively inserted to the loading slot IN so that each one part of the two discs is overlapped, the double insertion is detected. However, if two optical discs DS measuring 8 cm in diameter are consecutively inserted to the loading slot IN so that each one part of the two discs is overlapped, the double insertion can be detected.

Figure 9:
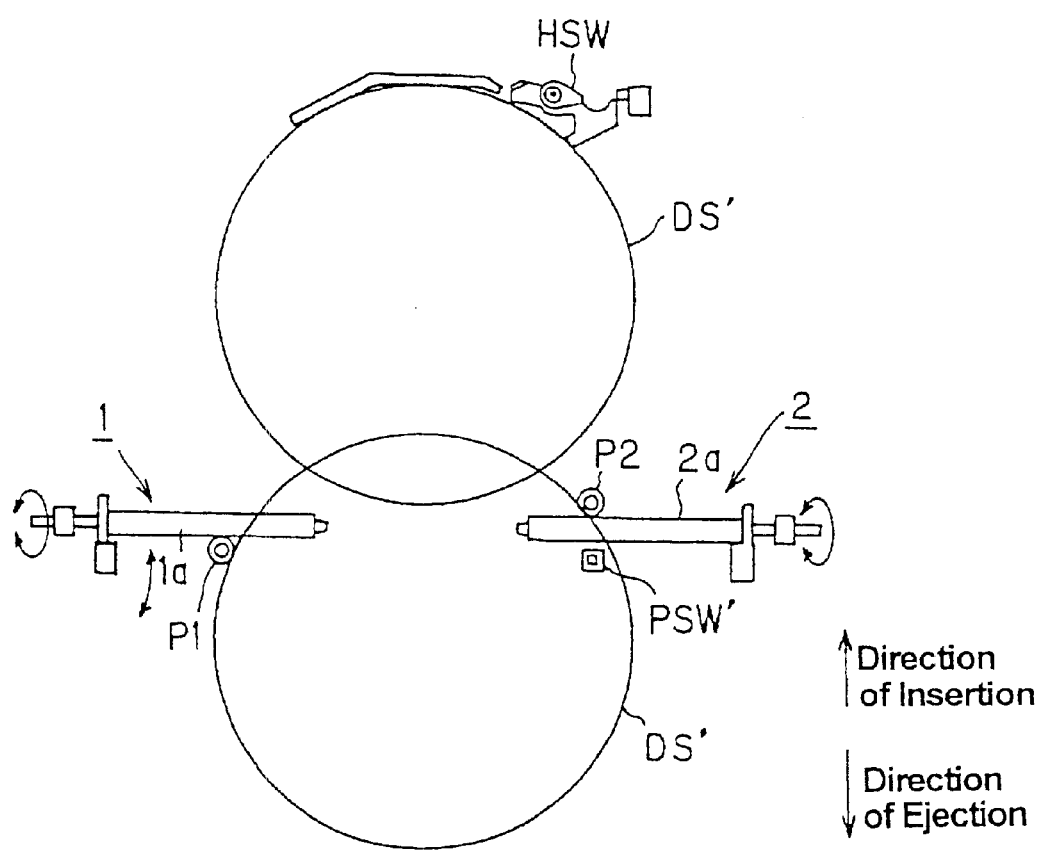
FIG. 9 is a plane view of outline configuration of the light-sensitive detector, the side switch, and the home switch in the second embodiment.

Namely, as shown in FIG. 9, in the information reproducing device of the second embodiment, in order to detect the double insertion by the two optical disc DS' measuring 8 cm, the side switch PSW is mounted on each position within the realm which the optical disc DS' passes through. In addition, the home switch HSW is mounted on the position where the state of the home switch changes from the OFF state into the ON state when the optical disc DS' correctly reaches the clamp position in the information reproducing device in the second embodiment.

The light-sensitive detectors P1, P2 is also mounted on the position where the insertion of each optical disc DS' to the loading slot IN can be detected at the time of loading as is the case with the first embodiment and where the passing of the end side of the optical disc DS' can be detected at the time of unloading.

Then the process of detecting the double insertion or the insertion of the foreign material as it is the case with the first embodiment shown in FIG. 8 is performed by using the light-sensitive detectors P1, P2, the side switch PSW, and the home switch, which are mounted as mentioned above.

The other configuration and the operation of the information reproducing device in the second embodiment is the same as those of the first embodiment. Therefore the detailed explanation is omitted.

As explained above, according to the loading in the information reproducing device of the second embodiment, the double insertion of the optical disc measuring 8 cm in diameter can be certainly detected as is the case with the first embodiment.

The Third Embodiment

Next, the third embodiment of the present invention will be explained with reference to FIG. 10.

In the above-mentioned first and second embodiment, in the case that two optical discs DS measuring 12 cm in diameter or two optical discs DS measuring 8 cm in diameter are consecutively inserted to the loading slot IN so that each one part of the two discs is overlapped, the double insertion is detected. However, in the both case that two optical discs DS measuring 12 cm in diameter are consecutively inserted to the loading slot IN so that each one part of the two discs is overlapped, and two optical discs DS measuring 8 cm in diameter are consecutively inserted to the loading slot IN so that each one part of the two discs is overlapped, the double insertion can be detected.

Figure 10:
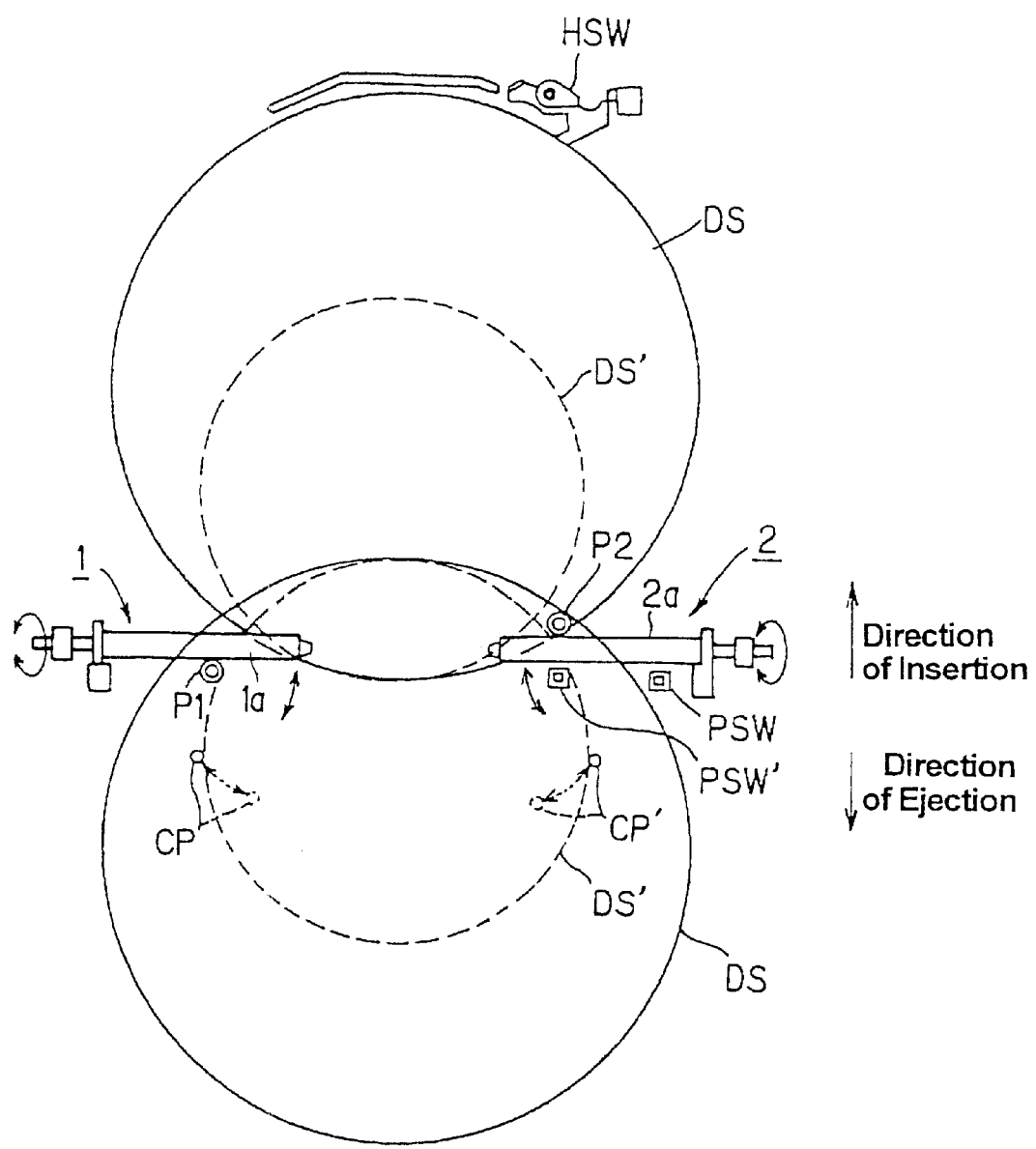
FIG. 10 is a plane view of outline configuration of the light-sensitive detector, the side switch, and the home switch in the third embodiment.

Namely, as shown in FIG. 10, in the information reproducing device of the third embodiment, in order to detect the double insertion by both of the two optical disc DS measuring 12 cm and the two optical disc DS' measuring 8 cm, the side switch PSW is mounted on each position within the realm which the optical disc DS passes through and the other side switch PSW' is mounted on each position within the realm which the optical disc DS' passes through.

In addition, the light-sensitive detectors P1, P2 is also mounted on the position where the insertion of each optical disc DS' and each optical disc DS to the loading slot IN can be detected at the time of loading and where the passing of the end side of the optical disc DS' and the end side of the optical disc DS can be detected at the time of unloading.

Further, in the information reproducing device shown in FIG. 10, a publicly known centering mechanism including centering pin CP and CP' are mounted in order to insert the optical disc DS or DS' by passing through the center of the loading slot IN at the time of loading of the optical disc DS and DS'.

Then it is determined whether an inserted optical disc is the optical disc DS or the optical disc DS' according to the operation of the centering mechanism, more specifically, the angle formed when each of the centering pin CP and CP' moves right and left at the time of loading of each disc. If it is determined that the inserted disc is the optical disc DS, the process of detecting the double insertion or the insertion of the foreign material is performed as is the case with the first embodiment shown in FIG. 8. If it is determined that the inserted disc is the optical disc DS', the process of detecting the double insertion or the insertion of the foreign material is performed as is the case with the second embodiment.

The other configuration and the operation of the information reproducing device in the second embodiment is the same as those of the first embodiment. Therefore the detailed explanation is omitted.

As explained above, according to the loading in the information reproducing device of the third embodiment, the double insertion of the optical disc DS measuring 12 cm in diameter and the double insertion of the optical disc DS' measuring 8 cm in diameter can be certainly detected as is the case with the first embodiment.

The Forth Embodiment

Next, the forth embodiment of the present invention will be explained with reference to FIG. 11.

In the above-mentioned first, second, and third embodiment, the present invention is applied for the loading of the optical disc DS or DS' in the information reproducing device which reproduces the recorded information on the optical disc DS or DS'. In addition, the present invention can be applied for the loading of the recordable optical disc in the information recording device which records recording information on the recordable disc.

Figure 11:
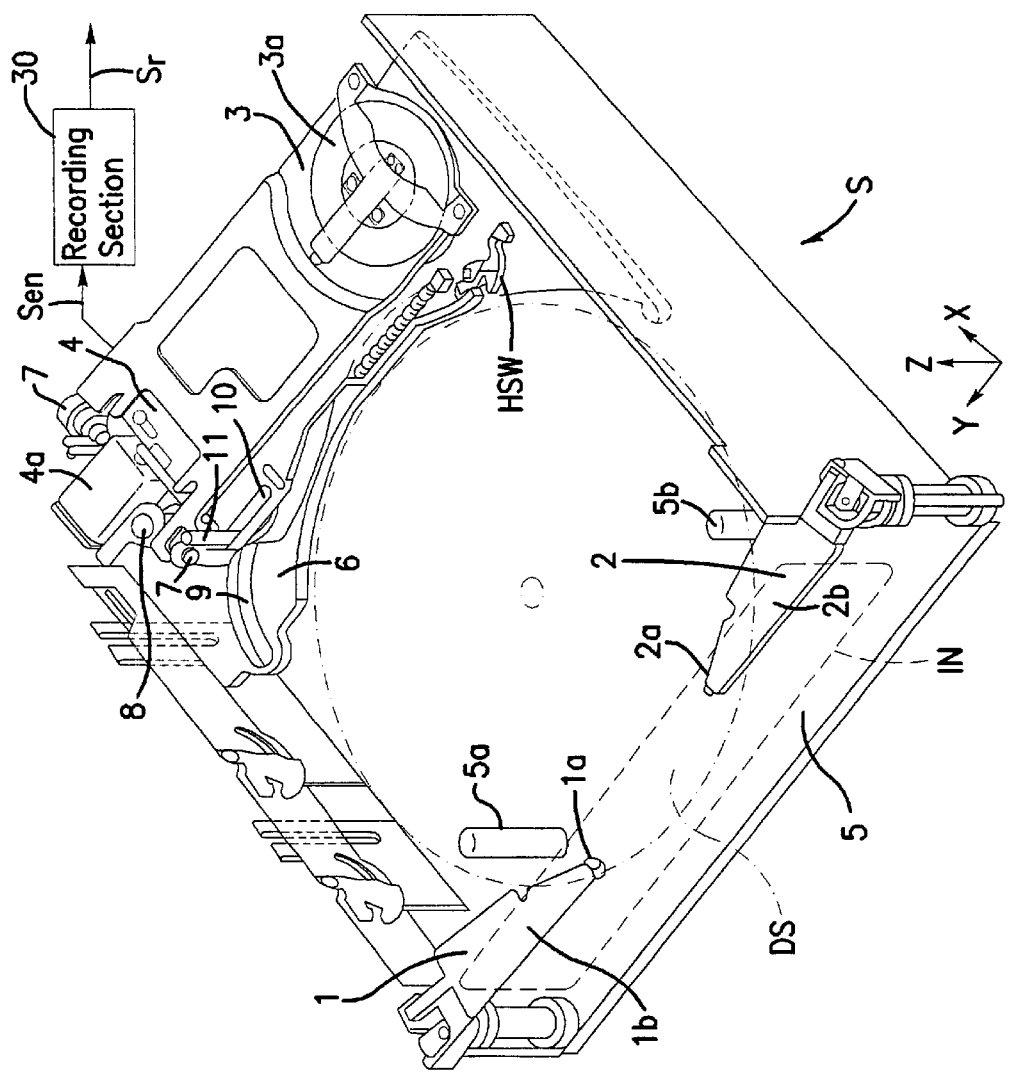
FIG. 11 is a perspective view of outline configuration of the information reproducing device in the forth embodiment.
Figure 12:
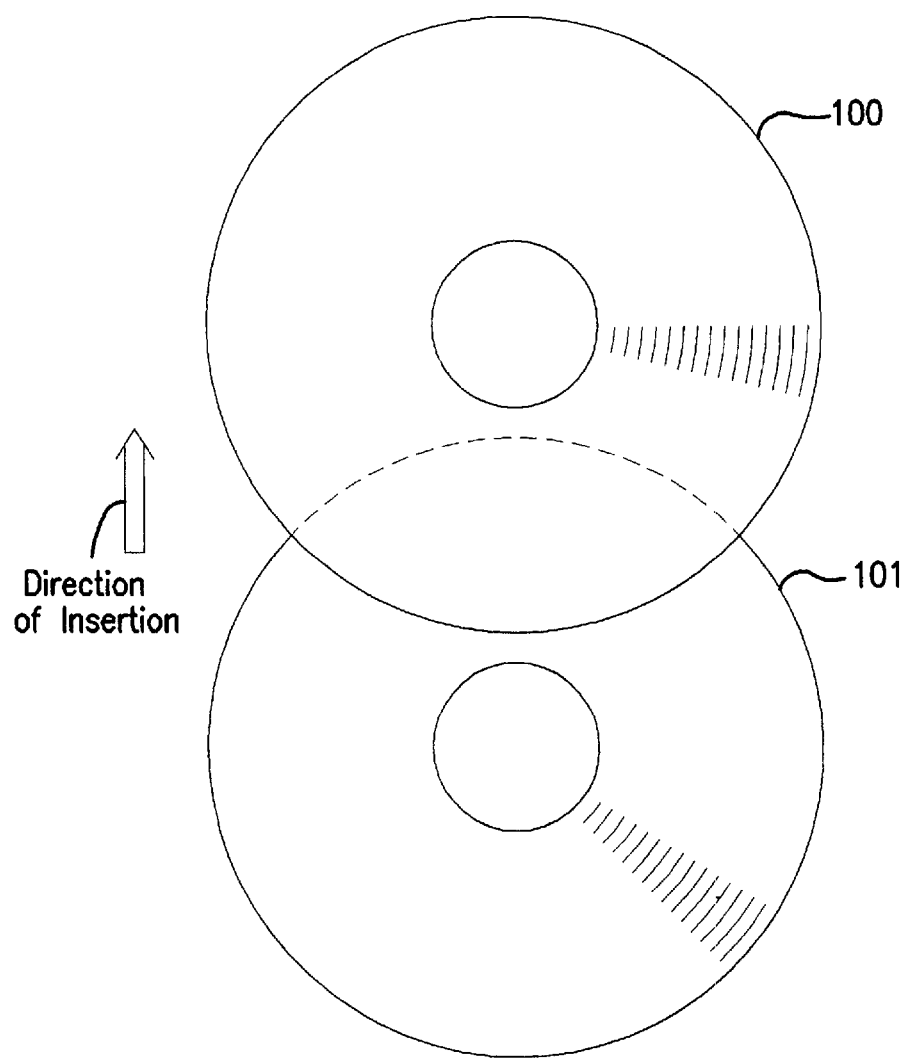
FIG. 12 is a plane view for showing a conventional information reproducing device.

In this case, as shown in FIG. 11, in addition to the reproducing sector 20 in the first, second, and third embodiment, a recording sector 30 is installed in the information recording device R. The recording sector 30 performs the recording processing such as encoding to the recording information Sr inputted from the external. Then the recording sector 30 generates a recording signal Sen and has the light source of the main body 4c of the optical pickup irradiate a recording light beam to the recordable disc by driving the light source. Consequently, recording of the recording information is performed.

The configuration and the operation of the disc carrying mechanism, the clamping mechanism, the optical pickup mechanism and the holding tray are the same as the disc carrying mechanism 1, 2, the clamping mechanism 3, the optical pickup mechanism 4 and the holding tray 12 in the first, second, and third embodiment. Therefore the detailed explanation is omitted.

As explained above, according to the loading in the information reproducing device of the forth embodiment, the double insertion of the optical disc measuring 12 cm or 8 cm in diameter can be certainly detected as is the case with the first, second, and third embodiment.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. H11-281993 filed on Oct. 1, 1999 including the specification, claims, drawings and summary is incorporated herein by reference in its entirety.

What is claimed is:

1. An apparatus for detecting the absence or the presence of the occurrence of the abnormal insertion that a plurality of disc bodies each of which should be inserted separately one by one are inserted consecutively comprising:

a passing detecting device for detecting the passing of the disc body, mounted on a passing route of the disc body, and a determining device for determining the occurrence of the abnormal insertion if the detecting device detects the passing again after the detecting device detected the passing once.

2. An apparatus according to claim 1, wherein said passing detecting device is provided with:

an irradiating device for irradiating a light beam on the passing route of the disc body, and a disc body detecting device for detecting that the disc body passes through the passing route when the light beam is shielded.

3. An apparatus according to claim 1, wherein said passing detecting device includes a contact detecting device which detects that the disc body passes through the passing route if the disc body passing through the passing route contacts with the contact detecting device.

4. An apparatus according to claim 1, wherein said passing detecting device further comprising:

a holding device for holding the disc body;

a ejecting device for ejecting the disc body being inserted when the determining device determines the occurrence of the abnormal insertion.

5. An apparatus according to claim 1, wherein said passing detecting device further comprising:

a holding device for holding the disc body;

a announcing device for announcing the occurrence of the abnormal insertion when the determining device determines the occurrence of the abnormal insertion.

6. An apparatus for detecting the absence or the presence of an occurrence of an abnormal insertion that a plurality of disc bodies each of which should be inserted separately one by one are inserted consecutively comprising:

a passing detecting device for detecting a passing of the disc body, mounted on a passing route of the disc body;

a completion detecting device for detecting a completion of a carrying of the disc body when the disc body reaches a predetermined position after the disc body is inserted, and a determining device for determining the occurrence of the abnormal insertion if the detecting device detects the passing of the disc body when the completion detecting device detects the completion of the carrying of the disc body.

7. An apparatus according to claim 6, wherein said passing detecting device is provided with:

an irradiating device for irradiating a light beam on the passing route of the disc body, and a disc body detecting device for detecting that the disc body passes through the passing route when the light beam is shielded.

8. An apparatus according to claim 6, wherein said passing detecting device includes a contact detecting device which detects that the disc body passes through the passing route if the disc body passing through the passing route contacts with the contact detecting device.

9. An apparatus according to claim 6, wherein said passing detecting device further comprising:

a holding device for holding the disc body;

a ejecting device for ejecting the disc body being inserted when the determining device determines the occurrence of the abnormal insertion.

10. An apparatus according to claim 6, wherein said passing detecting device further comprising:

a holding device for holding the disc body;

a announcing device for announcing the occurrence of the abnormal insertion when the determining device determines the occurrence of the abnormal insertion.

11. An apparatus for detecting the absence or the presence of an occurrence of an abnormal insertion that a plurality of disc bodies each of which should be inserted separately one by one are inserted consecutively comprising:

a passing detecting device for detecting a passing of the disc body, mounted on a passing route of the disc body;

a passing time detecting device for detecting a passing time when the passing detecting device detects the passing of the disc body, and a determining device for determining the occurrence of the abnormal insertion if the passing time is longer than the predetermined time corresponding to a size of the disc body.

12. An apparatus according to claim 11, wherein said passing detecting device is provided with:

an irradiating device for irradiating a light beam on the passing route of the disc body, and a disc body detecting device for detecting that the disc body passes through the passing route when the light beam is shielded.

13. An apparatus according to claim 11, wherein said passing detecting device includes a contact detecting device which detects that the disc body passes through the passing route if the disc body passing through the passing route contacts with the contact detecting device.

14. An apparatus according to claim 11, wherein said passing detecting device further comprising:

a holding device for holding the disc body;

a ejecting device for ejecting the disc body being inserted when the determining device determines the occurrence of the abnormal insertion.

15. An apparatus according to claim 11, wherein said passing detecting device further comprising:

a holding device for holding the disc body;

a announcing device for announcing the occurrence of the abnormal insertion when the determining device determines the occurrence of the abnormal insertion.

16. A method of detecting the absence or the presence of the occurrence of the abnormal insertion that a plurality of disc bodies each of which should be inserted separately one by one are inserted consecutively, comprising the processes of:

detecting the passing of the disc body on a passing route of the disc body, and determining the occurrence of the abnormal insertion if the process of detecting the passing again is performed after the process of detecting the passing was performed once.

17. A method according to claim 16, wherein said detecting process is provided with:

an irradiating process of irradiating a light beam on the passing route of the disc body, and a disc body detecting process of detecting that the disc body passes through the passing route when the light beam is shielded.

18. A method according to claim 16, wherein said detecting process includes a contact detecting process which detects that the disc body passes through the passing route if the disc body passing through the passing route contacts with a contact detecting device.

19. A method according to claim 16, wherein said detecting process further comprising:

a holding process of holding the disc body;

a ejecting process of ejecting the disc body being inserted when the determining process determines the occurrence of the abnormal insertion.

20. A method according to claim 16, wherein said detecting process further comprising:

a holding process of holding the disc body;

a announcing process of announcing the occurrence of the abnormal insertion when the determining process determines the occurrence of the abnormal insertion.

21. A method of detecting the absence or the presence of an occurrence of an abnormal insertion that a plurality of disc bodies each of which should be inserted separately one by one are inserted consecutively, comprising the process of:

detecting a passing of the disc body, on a passing route of the disc body;

detecting a completion of a carrying of the disc body when the disc body reaches a predetermined position after the disc body is inserted, and determining the occurrence of the abnormal insertion if the detecting process detects the passing of the disc body when the completion detecting process detects the completion of the carrying of the disc body.

22. A method according to claim 21, wherein said detecting process is provided with:

an irradiating process of irradiating a light beam on the passing route of the disc body, and a disc body detecting process of detecting that the disc body passes through the passing route when the light beam is shielded.

23. A method according to claim 21, wherein said detecting process includes a contact detecting process which detects that the disc body passes through the passing route if the disc body passing through the passing route contacts with a contact detecting device.

24. A method according to claim 21, wherein said detecting process further comprising:

a holding process of holding the disc body;

a ejecting process of ejecting the disc body being inserted when the determining process determines the occurrence of the abnormal insertion.

25. A method according to claim 21, wherein said detecting process further comprising:

a holding process of holding the disc body;

a announcing process of announcing the occurrence of the abnormal insertion when the determining process determines the occurrence of the abnormal insertion.

26. A method of detecting the absence or the presence of an occurrence of an abnormal insertion that a plurality of disc bodies each of which should be inserted separately one by one are inserted consecutively, comprising the process of:

detecting a passing of the disc body on a passing route of the disc body;

detecting a passing time when the passing detecting process detects the passing of the disc body, and determining the occurrence of the abnormal insertion if the passing time is longer than the predetermined time corresponding to a size of the disc body.

27. A method according to claim 26, wherein said detecting process is provided with:

an irradiating process of irradiating a light beam on the passing route of the disc body, and a disc body detecting process of detecting that the disc body passes through the passing route when the light beam is shielded.

28. A method according to claim 26, wherein said detecting process includes a contact detecting process which detects that the disc body passes through the passing route if the disc body passing through the passing route contacts with a contact detecting device.

29. A method according to claim 26, wherein said detecting process further comprising:

a holding process of holding the disc body;

a ejecting process of ejecting the disc body being inserted when the determining process determines the occurrence of the abnormal insertion.

30. A method according to claim 26, wherein said detecting process further comprising:

a holding process of holding the disc body;

a announcing process of announcing the occurrence of the abnormal insertion when the determining process determines the occurrence of the abnormal insertion.

* * * * *